(12) United States Patent
Skorka et al.

(10) Patent No.: US 12,526,533 B2
(45) Date of Patent: Jan. 13, 2026

(54) ADAPTIVE OPTICAL ATTENUATION IN HIGH DYNAMIC RANGE IMAGING

(71) Applicant: SEMICONDUCTOR COMPONENTS INDUSTRIES, LLC, Scottsdale, AZ (US)

(72) Inventors: Orit Skorka, Santa Clara, CA (US); Barry Vanhoff, Corvallis, OR (US); Radu Ispasoiu, Saratoga, CA (US); Vladimir Korobov, San Mateo, CA (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 77 days.

(21) Appl. No.: 18/607,172

(22) Filed: Mar. 15, 2024

(65) Prior Publication Data

US 2024/0348938 A1     Oct. 17, 2024

Related U.S. Application Data

(60) Provisional application No. 63/495,921, filed on Apr. 13, 2023.

(51) Int. Cl.
*H04N 23/75* (2023.01)
*H04N 23/741* (2023.01)
*H04N 23/745* (2023.01)
*H04N 25/587* (2023.01)

(52) U.S. Cl.
CPC .......... *H04N 23/75* (2023.01); *H04N 23/741* (2023.01); *H04N 23/745* (2023.01); *H04N 25/587* (2023.01)

(58) Field of Classification Search
CPC ...... H04N 23/70; H04N 23/71; H04N 23/741; H04N 23/745; H04N 23/75; H04N 25/58; H04N 25/587
See application file for complete search history.

(56) References Cited

U.S. PATENT DOCUMENTS

| | | | |
|---|---|---|---|
| 2005/0270412 A1 | 12/2005 | Kamon et al. | |
| 2008/0266424 A1* | 10/2008 | Asoma | H04N 23/73 348/E5.037 |
| 2017/0078550 A1* | 3/2017 | Terasawa | G03B 7/08 |
| 2021/0026164 A1* | 1/2021 | Skorka | G01J 4/04 |
| 2021/0223664 A1 | 7/2021 | Maharshi et al. | |
| 2022/0232156 A1 | 7/2022 | Skorka et al. | |

* cited by examiner

*Primary Examiner* — Daniel M Pasiewicz
(74) *Attorney, Agent, or Firm* — Dickinson Wright PLLC; Jonathan A. Schnayer

(57) ABSTRACT

Image sensors, imaging systems, and methods for high dynamic range imaging. The image sensor includes image sensor pixels, a light filter, and a controller. The light filter is configured to attenuate transmission of incident light to the image sensor pixels. The controller is configured to set the light filter to a high-transmission state and capture a first image generated by the image sensor pixels during a first exposure. The controller is also configured to set the light filter to a low-transmission state and capture a second image generated by the image sensor pixels during a second exposure. The controller is further configured to combine the first and second images to generate a high dynamic range image. The controller is also configured to adjust an attenuation of the light filter for a next iteration of the low-transmission state based on pixel signals generated during the second exposure.

20 Claims, 13 Drawing Sheets

| $T_2(1)$ | $T_2(2)$ | $T_2(3)$ | $T_2(4)$ |
|---|---|---|---|
| $T_2(5)$ | $T_2(6)$ | $T_2(7)$ | $T_2(8)$ |
| $T_2(9)$ | $T_2(10)$ | $T_2(11)$ | $T_2(12)$ |
| $T_2(13)$ | $T_2(14)$ | $T_2(15)$ | $T_2(16)$ |

| $T_1(1)$ | $T_1(2)$ | $T_1(3)$ | $T_1(4)$ |
|---|---|---|---|
| $T_1(5)$ | $T_1(6)$ | $T_1(7)$ | $T_1(8)$ |
| $T_1(9)$ | $T_1(10)$ | $T_1(11)$ | $T_1(12)$ |
| $T_1(13)$ | $T_1(14)$ | $T_1(15)$ | $T_1(16)$ |

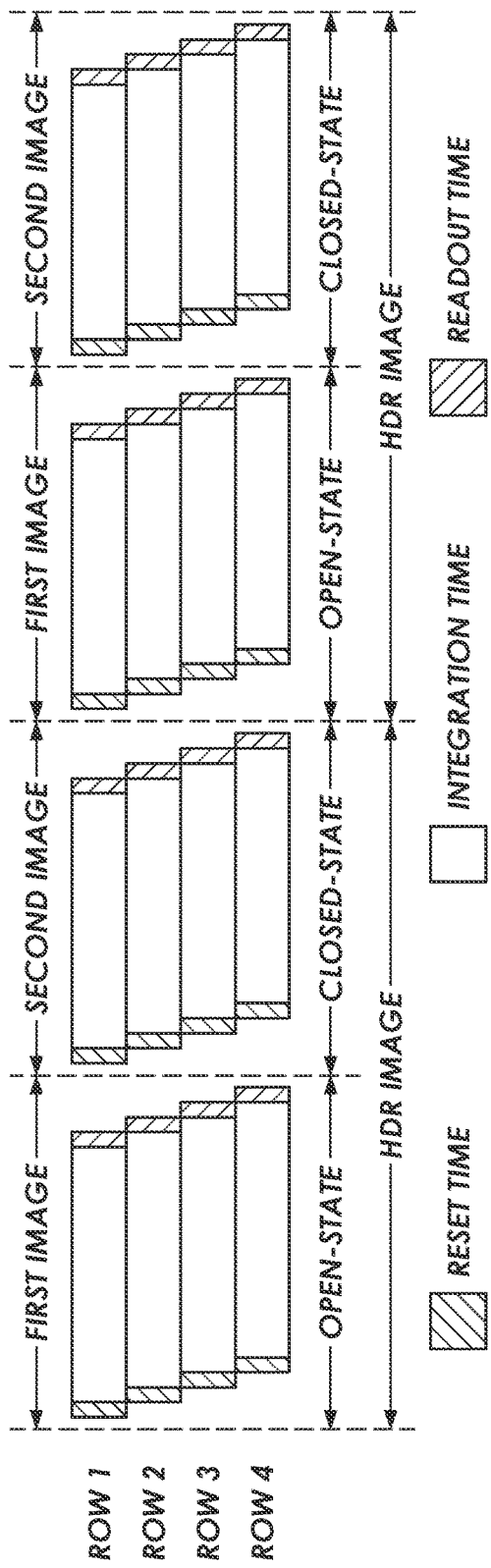
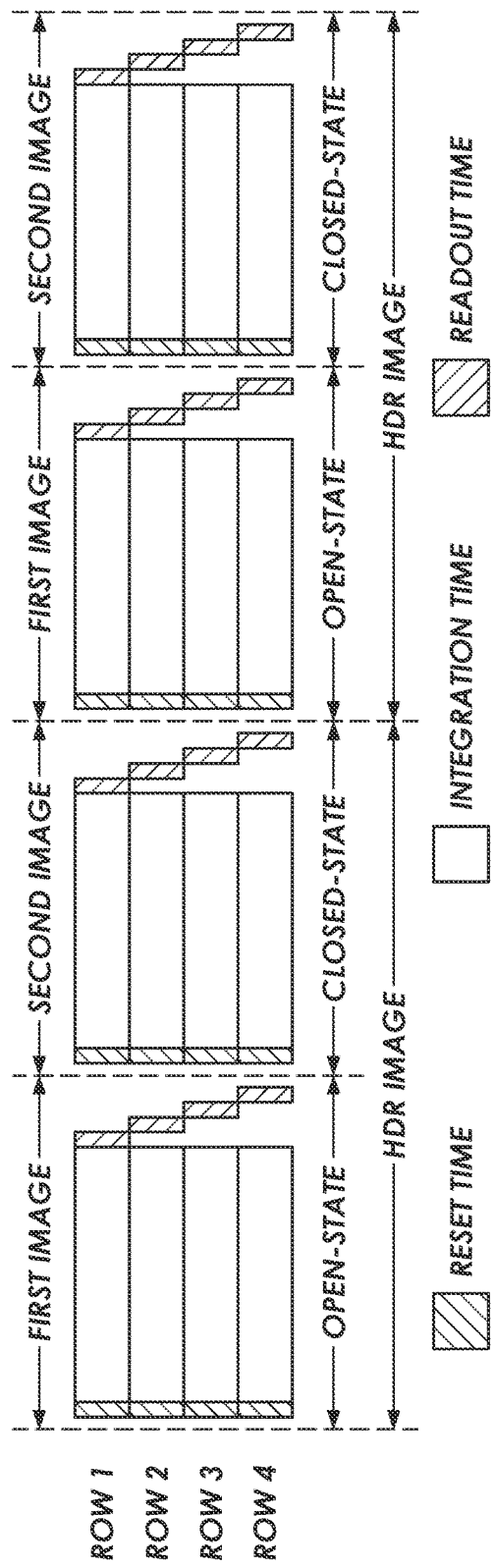
FIG. 6A
FIG. 6B

ADAPTIVE OPTICAL ATTENUATION IN HIGH DYNAMIC RANGE IMAGING

CROSS-REFERENCE TO RELATED APPLICATIONS

This application claims priority to and the benefit of U.S. Provisional Application Ser. No. 63/495,921 filed Apr. 14, 2023, titled "ADAPTIVE OPTICAL ATTENUATION FOR A DEVICE WITH AN IMAGE SENSOR AND A PARTIALLY TRANSMISSIVE ELECTRONIC SHUTTER," the entire disclosure of which is hereby incorporated by reference for all purposes.

BACKGROUND

Image sensors are used in electronic devices such as cellular telephones, cameras, and computers to capture images. In particular, an electronic device is provided with an array of image sensor pixels arranged in a grid pattern. Each image sensor pixel receives incident photons, such as light, and converts the photons into electrical signals. Column circuitry is coupled to each column for reading out sensor signals from each image sensor pixel.

SUMMARY

High dynamic range (HDR) images can be created by combining pixel signals generated by image sensor pixels during two or more different exposures. A light filter may be used to attenuate incident light during one of the exposures. However, the dynamic range of the scene may change over time. Thus, the present disclosure provides image sensors, imaging systems, and methods that, among other things, adapt the attenuation of the light filter to cover the dynamic range of the scene with a high signal-to-noise ratio in the transition region of the combined response.

The present disclosure provides an image sensor including, in one implementation, a plurality of image sensor pixels, a light filter, and a controller. The light filter is configured to attenuate transmission of incident light to the plurality of image sensor pixels. The controller is configured to set the light filter to a high-transmission state for a first exposure. The controller is also configured to capture a first image generated by the plurality of image sensor pixels during the first exposure. The controller is further configured to set the light filter to a low-transmission state for a second exposure. The controller is also configured to capture a second image generated by the plurality of image sensor pixels during the second exposure. The controller is further configured to combine the first image and the second image to generate a high dynamic range image. The controller is also configured to adjust an attenuation of the light filter for a next iteration of the low-transmission state based on one or more pixel signals generated by the plurality of image sensor pixels during the second exposure.

The present disclosure also provides an imaging system including, in one implementation, an image sensor, a light filter and an imaging controller. The light filter is configured to attenuate transmission of incident light to the image sensor. The imaging controller is configured to capture a first image generated by the image sensor during the first exposure. The imaging controller is also configured to set the light filter to a low-transmission state for a second exposure. The imaging controller is further configured to capture a second image generated by the image sensor during the second exposure. The imaging controller is also configured to combine the first image and the second image to generate a high dynamic range image. The imaging controller is further configured to adjust an attenuation of the light filter for a next iteration of the low-transmission state based on one or more pixel signals generated by the image sensor during the second exposure.

The present disclosure further provides a method for high dynamic range imaging. The method includes setting a light filter to a high-transmission state for a first exposure, wherein the light filter is configured to attenuate transmission of incident light to an image sensor. The method also includes generating a first image with the image sensor during the first exposure. The method further includes setting the light filter to a low-transmission state for a second exposure. The method also includes generating a second image with the image sensor during the second exposure. The method further combining the first image and the second image to generate a high dynamic range image. The method also includes adjusting an attenuation of the light filter for a next iteration of the low-transmission state based on one or more pixel signals generated by the image sensor during the second exposure.

BRIEF DESCRIPTION OF THE DRAWINGS

For a detailed description of example implementations, reference will now be made to the accompanying drawings in which:

FIG. 5A is a diagram of an example of a long exposure image generated by a portion of a pixel array in accordance with some implementations;

FIG. 5B is a diagram of an example of a short exposure image generated by a portion of a pixel array in accordance with some implementations;

FIG. 6A is a timing diagram for an example of high dynamic range (HDR) imaging with a rolling shutter in accordance with some implementations;

FIG. 6B is a timing diagram for an example of HDR imaging with a global shutter in accordance with some implementations;

DEFINITIONS

Figure 1A:
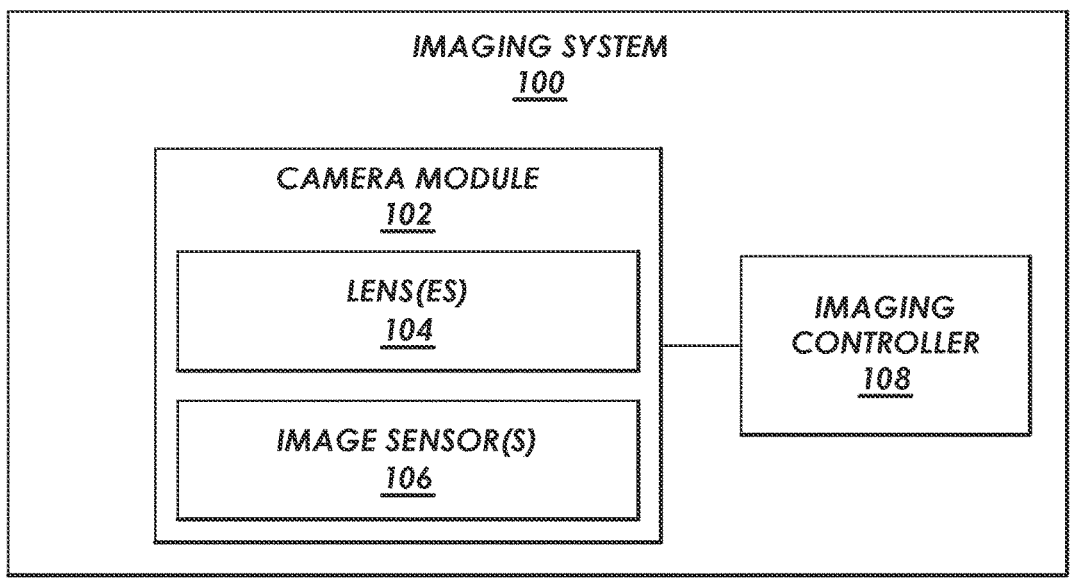
FIG. 1A is a block diagram of an example of an imaging system in accordance with some implementations.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

Terms defining an elevation, such as "above," "below," "upper", and "lower" shall be locational terms in reference to a direction of light incident upon a pixel array and/or an image pixel. Light entering shall be considered to interact with or pass objects and/or structures that are "above" and "upper" before interacting with or passing objects and/or structures that are "below" or "lower." Thus, the locational terms may not have any relationship to the direction of the force of gravity.

In relation to electrical devices, whether stand alone or as part of an integrated circuit, the terms "input" and "output" refer to electrical connections to the electrical devices, and shall not be read as verbs requiring action. For example, a differential amplifier, such as an operational amplifier, may have a first differential input and a second differential input, and these "inputs" define electrical connections to the operational amplifier, and shall not be read to require inputting signals to the operational amplifier.

"Light" or "color" shall mean visible light ranging between about 380 and 700 nanometers (nm). "Light" or "color" shall also mean invisible light, such as infrared light ranging between about 800 nm and 1 millimeter. "Light" or "color" shall also mean invisible light, such as ultraviolet light ranging between about 100 to 400 nm.

"Controller" shall mean, alone or in combination, individual circuit components, an application specific integrated circuit (ASIC), one or more microcontrollers with controlling software, a reduced-instruction-set computer (RISC) with controlling software, a digital signal processor (DSP), one or more processors with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various implementations of the invention. Although one or more of these implementations may be preferred, the implementations disclosed should not be interpreted, or otherwise used as, limiting the scope of the present disclosure, including the claims. In addition, one skilled in the art will understand that the following description has broad application, and the discussion of any implementation is meant only to be exemplary of that implementation, and not intended to intimate that the scope of the present disclosure, including the claims, is limited to that implementation.

Various examples are directed to systems and methods that capture and combine images from consecutive exposures to generate high dynamic range (HDR) images. More particularly, various examples are directed to imaging systems that generate short exposures by using a light filter to attenuate incident light on an image sensor over a long integration time. More particularly still, various examples are directed to imaging systems and related controllers that adjust the attenuation of the light filter to cover the dynamic range of the scene. The specification now turns to an example system to orient the reader.

FIG. 1A shows an example of an imaging system 100. In particular, the imaging system 100 may be a portable electronic device such as a camera, a cellular telephone, a tablet computer, a webcam, a video camera, a video surveillance system, or a video gaming system with imaging capabilities. In other cases, the imaging system 100 may be an automotive imaging system. The imaging system 100 illustrated in FIG. 1A includes a camera module 102 that may be used to convert incoming light into digital image data. The camera module 102 may include one or more lenses 104 and one or more corresponding image sensors 106. The lenses 104 may include fixed and/or adjustable lenses. During image capture operations, light from a scene may be focused onto the image sensor 106 by the lenses 104. The image sensor 106 may comprise circuitry for converting analog pixel data into corresponding digital image data to be provided to the imaging controller 108. If desired, the camera module 102 may be provided with an array of lenses 104 and an array of corresponding image sensors 106.

The imaging controller 108 may include one or more integrated circuits. The imaging circuits may include image processing circuits, microprocessors, and storage devices, such as random-access memory, and non-volatile memory. The imaging controller 108 may be implemented using components that are separate from the camera module 102 and/or that form part of the camera module 102, for example, circuits that form part of the image sensor 106. Digital image data captured by the camera module 102 may be processed and stored using the imaging controller 108. Processed image data may, if desired, be provided to external equipment, such as computer, external display, or other device, using wired and/or wireless communications paths coupled to the imaging controller 108.

Figure 1B:
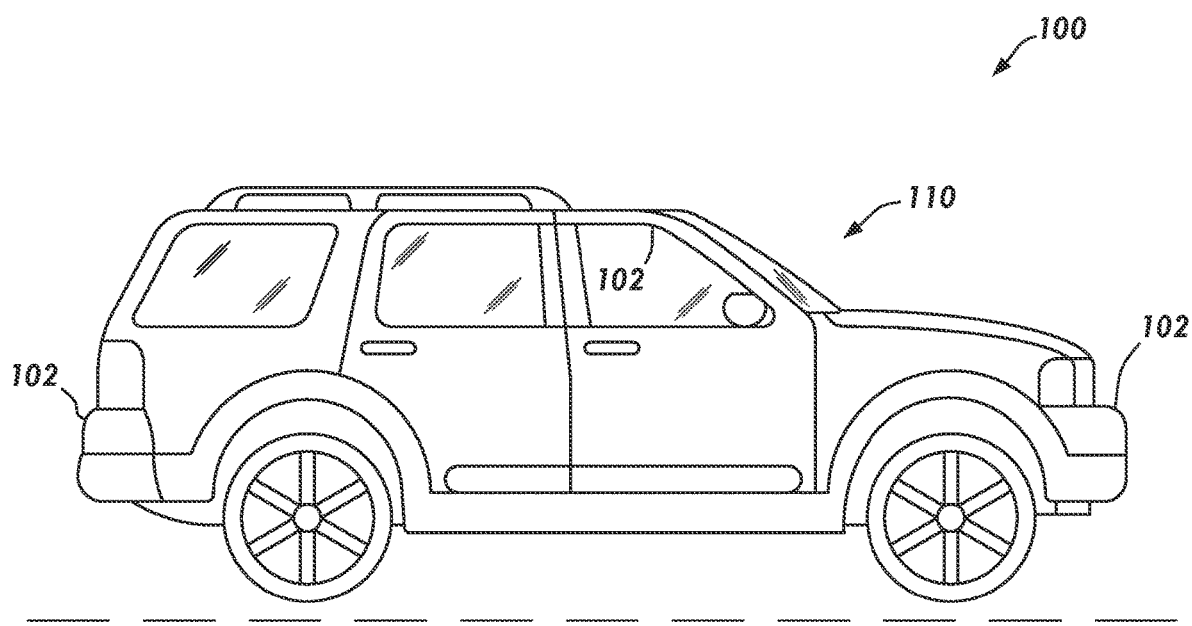
FIG. 1B is a diagram of an example of an imaging system incorporated in a vehicle in accordance with some implementations.

FIG. 1B shows another example of the imaging system 100. The imaging system 100 illustrated in FIG. 1B comprises an automobile or vehicle 110. The vehicle 110 is illustratively shown as a passenger vehicle, but the imaging system 100 may be other types of vehicles, including commercial vehicles, on-road vehicles, and off-road vehicles. Commercial vehicles may include busses and tractor-trailer vehicles. Off-road vehicles may include tractors and crop harvesting equipment. In the example of FIG. 1B, the vehicle 110 includes a forward-looking camera module 102 arranged to capture images of scenes in front of the vehicle 110. Such a forward-looking camera module 102 can be used for any suitable purpose, such as lane-keeping assist, collision warning systems, distance-pacing cruise-control systems, autonomous driving systems, and proximity detection. The vehicle 110 further comprises a backward-looking camera module 102 arranged to capture images of scenes behind the vehicle 110. Such a backward-looking camera module 102 can be used for any suitable purpose, such as collision warning systems, reverse direction video, autonomous driving systems, proximity detection, monitoring position of overtaking vehicles, and backing up. The vehicle 110 further comprises a side-looking camera module 102 arranged to capture images of scenes beside the vehicle 110. Such a side-looking camera module 102 can be used for any suitable purpose, such as blind-spot monitoring, collision warning systems, autonomous driving systems, monitoring position of overtaking vehicles, lane-change detection, and proximity detection. In situations in which the imaging system 100 is a vehicle, the imaging controller 108 may be a controller of the vehicle 110. The discussion now turns in greater detail to the image sensor 106 of the camera module 102.

Figure 2:
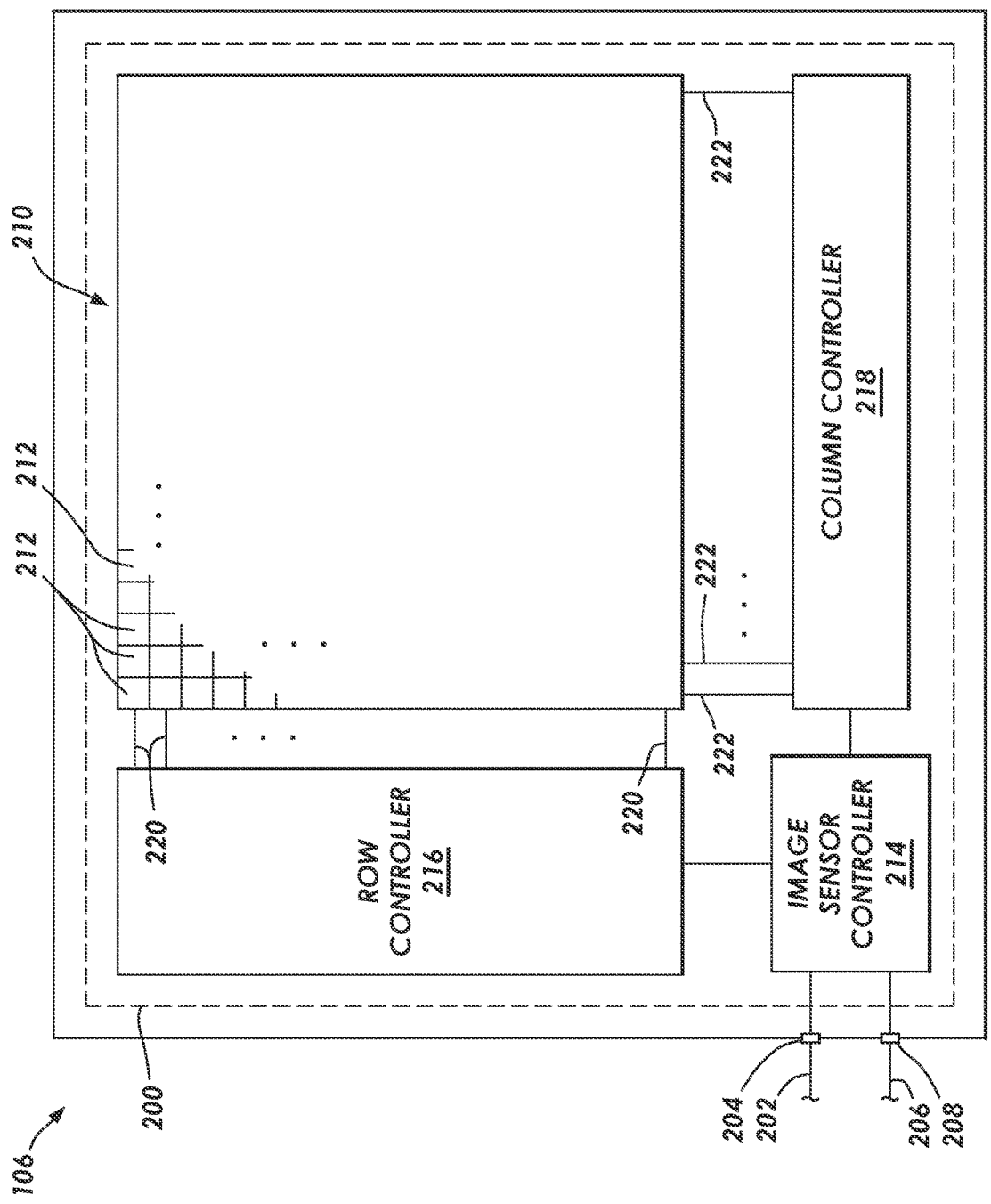
FIG. 2 is a partial schematic and a partial block diagram of an example of an image sensor in accordance with some implementations.

FIG. 2 shows an example of the image sensor 106. In particular, FIG. 2 shows that the image sensor 106 may comprise a substrate 200 of semiconductor material (for example, silicon) encapsulated within packaging to create a packaged semiconductor device or packaged semiconductor product. Bond pads or other connection points of the substrate 200 couple to terminals of the image sensor 106, such as a serial communication channel 202 coupled to a first terminal 204, and a capture input 206 coupled to a second terminal 208. Additional terminals will be present, such as ground, common, or power, but the additional terminals are omitted so as not to unduly complicate the figure. While a single instance of the substrate 200 is shown, in other implementations, multiple substrates may be combined to form the image sensor 106 in a multi-chip module.

The image sensor 106 illustrated in FIG. 2 includes a pixel array 210 with a plurality of image sensor pixels 212 arranged in rows and columns. The pixel array 210, being one example of an "array of pixels," may include, for example, hundreds or thousands of rows and columns of image sensor pixels 212. Control and readout of the pixel array 210 may be implemented by an image sensor controller 214 coupled to a row controller 216 and a column controller 218. The row controller 216 may receive row addresses from the image sensor controller 214 and supply corresponding row control signals to image sensor pixels 212, such as reset, row-select, charge transfer, dual conversion gain, and readout control signals. The row control signals may be communicated over one or more conductors, such as row control paths 220.

The column controller 218 may be coupled to the pixel array 210 by way of one or more conductors, such as column lines 222. Column controllers may sometimes be referred to as column control circuits, readout circuit, or column decoders. The column lines 222 may be used for reading out pixel signals from image sensor pixels 212 and for supplying bias currents and/or bias voltages to image sensor pixels 212. If desired, during pixel readout operations, a pixel row in the pixel array 210 may be selected using the row controller 216 and pixel signals generated by image sensor pixels 212 in that pixel row can be read out along the column lines 222. The column controller 218 may include sample-and-hold circuitry for sampling and temporarily storing pixel signals read out from the pixel array 210, amplifier circuitry, analog-to-digital conversion (ADC) circuitry, bias circuitry, column memory, latch circuitry for selectively enabling or disabling the column circuitry, or other circuitry that is coupled to one or more columns of image sensor pixels 212 in the pixel array 210 for operating the image sensor pixels 212 and for reading out pixel signals from image sensor pixels 212. ADC circuitry in the column controller 218 may convert analog pixel values received from the pixel array 210 into corresponding digital image data. The column controller 218 may supply digital image data to the image sensor controller 214 and/or the imaging controller 108 (FIG. 1A) over, for example, the serial communication channel 202.

Figure 3:
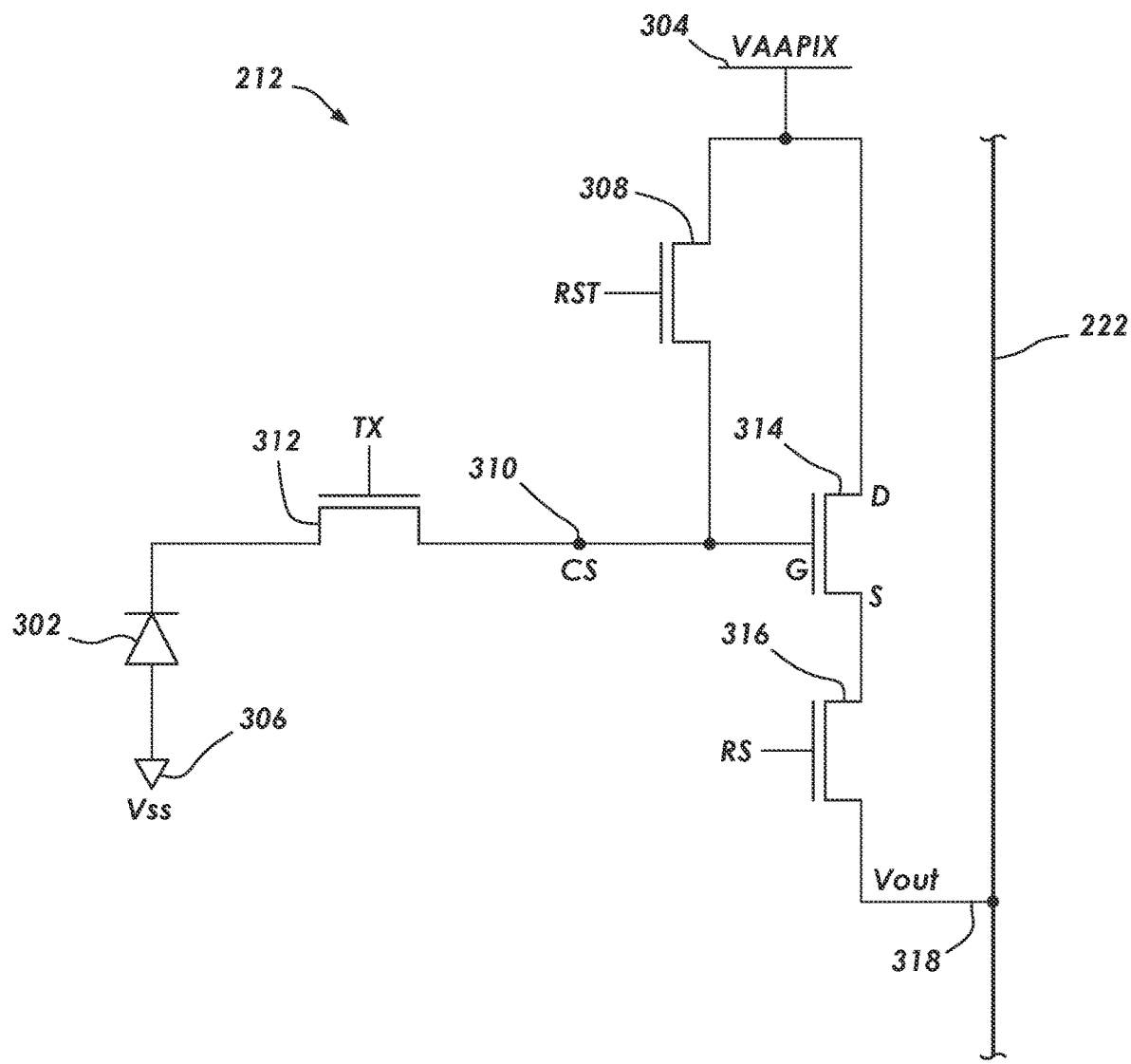
FIG. 3 is a schematic of an example of circuitry in an image sensor pixel in accordance with some implementations.

FIG. 3 shows an example of circuitry in one of the image sensor pixels 212. In particular, FIG. 3 shows that each of the image sensor pixels 212 may comprise a photodetector 302 (for example, a photodiode). A positive pixel power supply voltage, such as supply voltage VAAPIX, may be supplied at a positive power supply terminal 304. A ground power supply voltage, such a reference voltage Vss, may be supplied at a ground terminal 306. Incoming light is gathered by the photodetector 302, in some cases after the light passes through a color filter structure (not shown). The photodetector 302 converts the light to electrical charge.

Before an image is acquired, a reset control signal RST may be asserted. The reset control signal RST turns on a reset transistor 308 and resets a charge storage (CS) node 310 to a voltage equal or close to the supply voltage VAAPIX. The reset control signal RST may then be de-asserted to turn off the reset transistor 308. After the reset process is complete, a transfer gate control signal TX may be asserted to turn on a transfer transistor 312. When the transfer transistor 312 is turned on, charge generated by the photodetector 302 in response to incoming light is transferred to the charge storage node 310. The charge storage node 310 exhibits a capacitance that can be used to store the charge that has been transferred from the photodetector 302. The signal associated with the charge stored in the charge storage node 310 is buffered by a source-follower transistor 314. A row select transistor 316 connects the source-follower transistor 314 to one of the column lines 222.

When it is desired to read out the value of the charge stored in the charge storage node 310, a control signal RS is asserted. The read-out value may be, for example, the value of the charge storage node 310 that is represented by the signal at the source terminal S of the source-follower transistor 314. When the control signal RS is asserted, the row select transistor 316 is turned on and an output signal Vout that is representative of the magnitude of the charge stored in the charge storage node 310 is produced on an output path 318. The output signal Vout is one example of a "pixel signal." When the control signal RS is asserted, one of the column lines 222 can be used to route the output signal Vout from the image sensor pixel 212 to readout circuitry, such as the column controller 218 in FIG. 2.

An image sensor pixel 212 may include fewer components, additional components, or different components in different configurations than the one illustrated in FIG. 3. For example, the image sensor pixel 212 may include more than one photodetector. In some implementations, the image sensor pixel 212 may be a binned split-pixel that includes a plurality of low-light photodetectors and a high-light photodetector.

Figure 4:
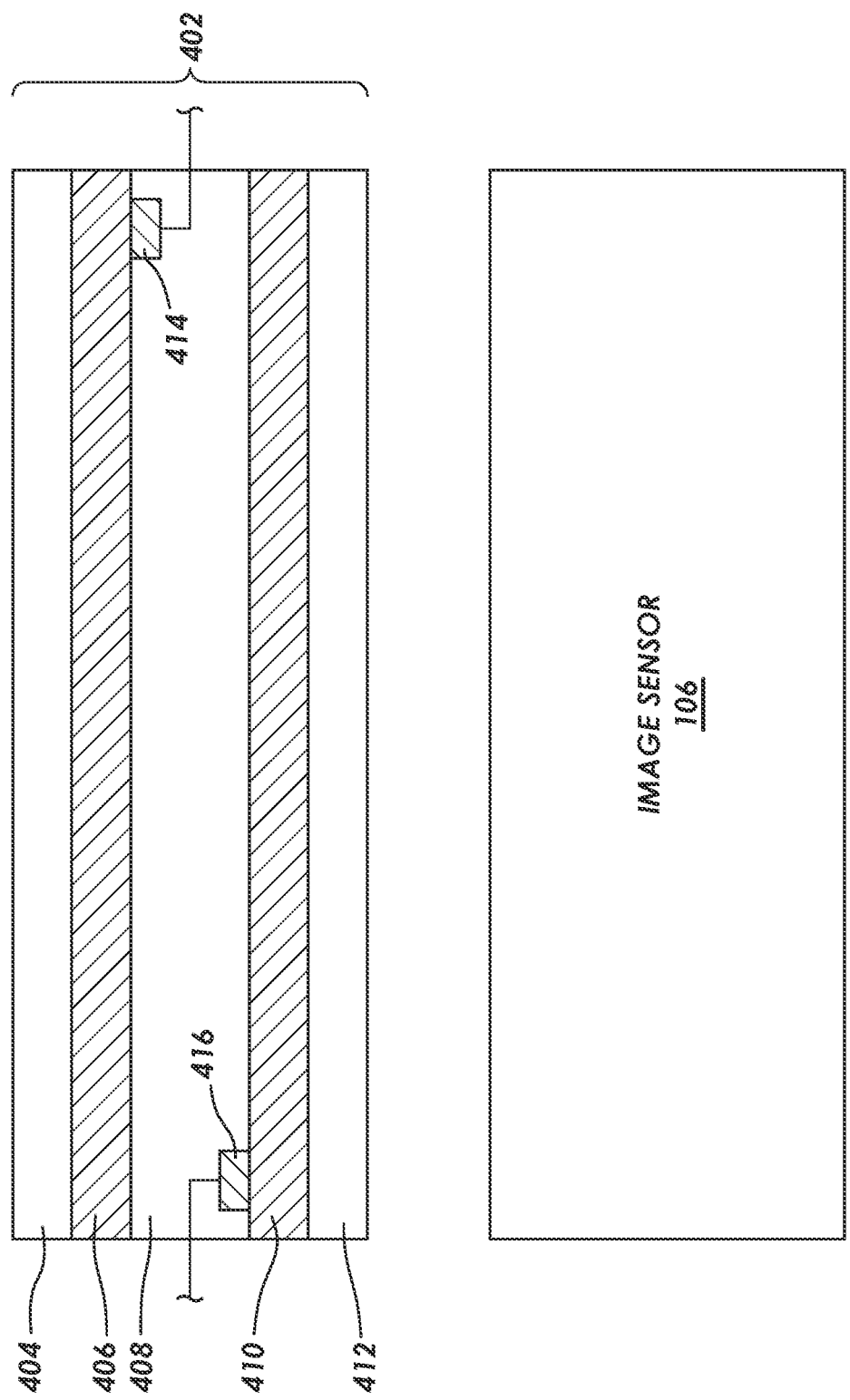
FIG. 4 is a cross-sectional side view of a light filter and an image sensor in accordance with some implementations.

FIG. 4 is a cross-sectional side view of an example of a light filter 402. The light filter 402 is positioned in front of the image sensor 106. The light filter 402 is configured to selectively attenuate incident light before the light reaches the image sensor 106. In some implementations, the light filter 402 is included in the image sensor 106. The light filter 402 illustrated in FIG. 4 includes a polarizer 404, a first electrode layer 406, a controllable polarization rotator 408 (which may be implemented with a liquid crystal layer), a second electrode layer 410, an analyzer 412, a first terminal 414, and a second terminal 416. The methods described herein may be used with light filters having fewer components, additional components, or different components in different configurations than the light filter 402 illustrated in FIG. 4.

The first terminal 414 is electrically coupled to the first electrode layer 406. The second terminal 416 is electrically coupled to the second electrode layer 410. The first terminal 414 and the second terminal 416 may be controlled to apply a desired electric field (or bias voltage) across the controllable polarization rotator 408. At a bias voltage with a first polarity, the controllable polarization rotator 408 may not rotate the polarization of incident light. At a bias voltage with an opposite polarity, the controllable polarization rotator 408 may rotate the polarization of incident light (for example, by ninety degrees). The light filter 402 is configured to attenuate transmission of incident light to the image sensor 106 proportional to the bias voltage. The magnitude of the bias voltage can be varied to control the attenuation of the light filter 402. For example, the peak-to-peak of the bias voltage can be varied to control the attenuation of the light filter. Controlled polarization rotation of the light that passes through the polarizer 404 allows the light filter 402 to have an adjustable transparency, thus selectively attenuating light provided to the image sensor 106. For example, the light filter 402 may provide more attenuation for a bias voltage of 5 Volts than for a bias voltage of 2 Volts. In some implementations, a current signal is used to control the attenuation of the light filter 402.

The light filter 402 is configured to operate in a high-transmission state and in a low-transmission state. In some implementations, while in the high-transmission state, the light filter 402 provides the maximum amount of light transmission that the light filter 402 can be controlled to provide. The light filter 402 provides less light transmission in the low-transmission state than in the high-transmission state.

When only one type of exposure is used by the imaging system 100, there will be a tradeoff between high light level performance and low light level performance. For example, if a short integration time is used for the exposure, the imaging system 100 may have improved high light level performance but poor low light level performance. If a long integration time is used, the imaging system 100 may have improved low light level performance but poor high light level performance. Pixel signals from multiple exposures may be used to increase the dynamic range of the imaging system 100. For example, an HDR image can be generated by combining a first image generated using a long integration time with a second image generated using a short integration time. However, in some applications, there may be restrictions on the integration times for the image sensor 106.

As one example, the integration time may need to have a minimum duration to avoid artifacts caused by flickering light in the scene. An example of flickering light includes light-emitting diodes (LEDs) that are commonly used in car headlights and in traffic signs (which can flicker tens of times per second). Flickering lights may change between on periods (in which light is emitted) and off periods (in which light is not emitted). Thus, when the integration time of the image sensor pixels 212 is not equal to or longer than a single pulse duration of the LEDs, one or more image sensor pixels 212 in the image sensor 106 may be integrating during an off period of the LEDs in some of the frames, which can cause the LEDs and the area that they illuminate to appear dark in these captured frame. This is especially true for bright scenery when integration times are short. Therefore, flickering light in the scene may cause various artifacts in images captured by the imaging system 100. The flickering light may cause flickering artifacts where an LED with a constant duty cycle appears to be on in one image and then off in a consecutive image. Flickering light may also cause color artifacts. Flickering artifacts may misguide machine vision systems. For example, in automotive applications, flickering artifacts may be interpreted as a turn signal or signals from an emergency vehicle.

To mitigate artifacts caused by flickering light in the scene, the integration time for the image sensor 106 may be selected to be sufficiently long to capture the on periods of the flickering light. For example, consider an LED in the scene that operates (i.e., has on periods) at a frequency of 90 Hertz. In this example, the time between each on period of the LED is 11.1 milliseconds. To ensure that the flickering light is captured by the image sensor 106, the integration time may therefore be selected to have a duration of at least 11.1 milliseconds. In bright scenes (or bright portions of a scene), however, this integration time may be too long and results in saturation of the image sensor 106. Usually, to capture a frame with low exposure that allows the details of very bright regions in the scene, the integration time is shortened. However, shortening the integration time below 11.1 milliseconds may result in artifacts from the flickering light.

The light filter 402 may be used to increase dynamic range without risking artifacts from flickering light in the scene. Returning to the aforementioned example of a bright scene that is limited to an integration time of at least 11.1 milliseconds, to capture a frame with low exposure, the light filter 402 may be placed in the low-transmission state where much of the incident light is attenuated and a small amount of light passes through to the image sensor 106. Attenuating the light in this manner prevents saturation of the image sensor 106 even at long integration times that meet the requirements to avoid flicker artifacts.

As described above, an HDR image can be generated by combining a first image generated using a long integration time with a second image generated using a short integration time. FIG. 5A is a diagram of a first image 502 (sometimes referred to as a "T1 image") generated by a portion of the pixel array 210. FIG. 5B is a diagram of a second image 504 (sometimes referred to as a "T2 image") generated by the same portion of the pixel array 210. The exposure of the second image 504 (an example of a "second exposure") is lower than the exposure of the first image 502 (an example of a "first exposure"). Exposure is the product of integration time and light intensity. Thus, the light filter 402 may be used to generate the second image with a long integration instead of a short integration time. For example, the imaging system 100 may generate the second image for a long integration time in which the light filter 402 is placed in the low-transmission state. Further, the light filter 402 may still be used to generate the first image. For example, the imaging system 100 may generate the first image for a long integration time in which the light filter 402 is placed in the high-transmission state.

In some implementations, the image sensor 106 operates with a rolling shutter scheme. FIG. 6A is a timing diagram of HDR imaging performed by the image sensor 106 with a rolling shutter scheme. As illustrated in FIG. 6A, each row of the image sensor pixels 212 in the pixel array 210 sequentially captures an image. In some implementations, the image sensor 106 operates with a global shutter scheme. FIG. 6B is a timing diagram of HDR imaging performed by the image sensor 106 with a global shutter scheme. As illustrated in FIG. 6B, each of the image sensor pixels 212 in the pixel array 210 simultaneously capture an image. As illustrated in FIGS. 6A and 6B, the first images are captured when the light filter 402 is in the high-transmission state and the second images are captured when the light filter 402 is in the low-transmission state. Each HDR image is generated by combining a first image and a second image. As illustrated in FIGS. 6A and 6B, the integration time of each first image is substantially the same as the integration time of each second image. In some implementations, different integration times are used for the first image and the second image, where both integration times are sufficiently long to mitigate flickering light artifacts.

Figure 7:
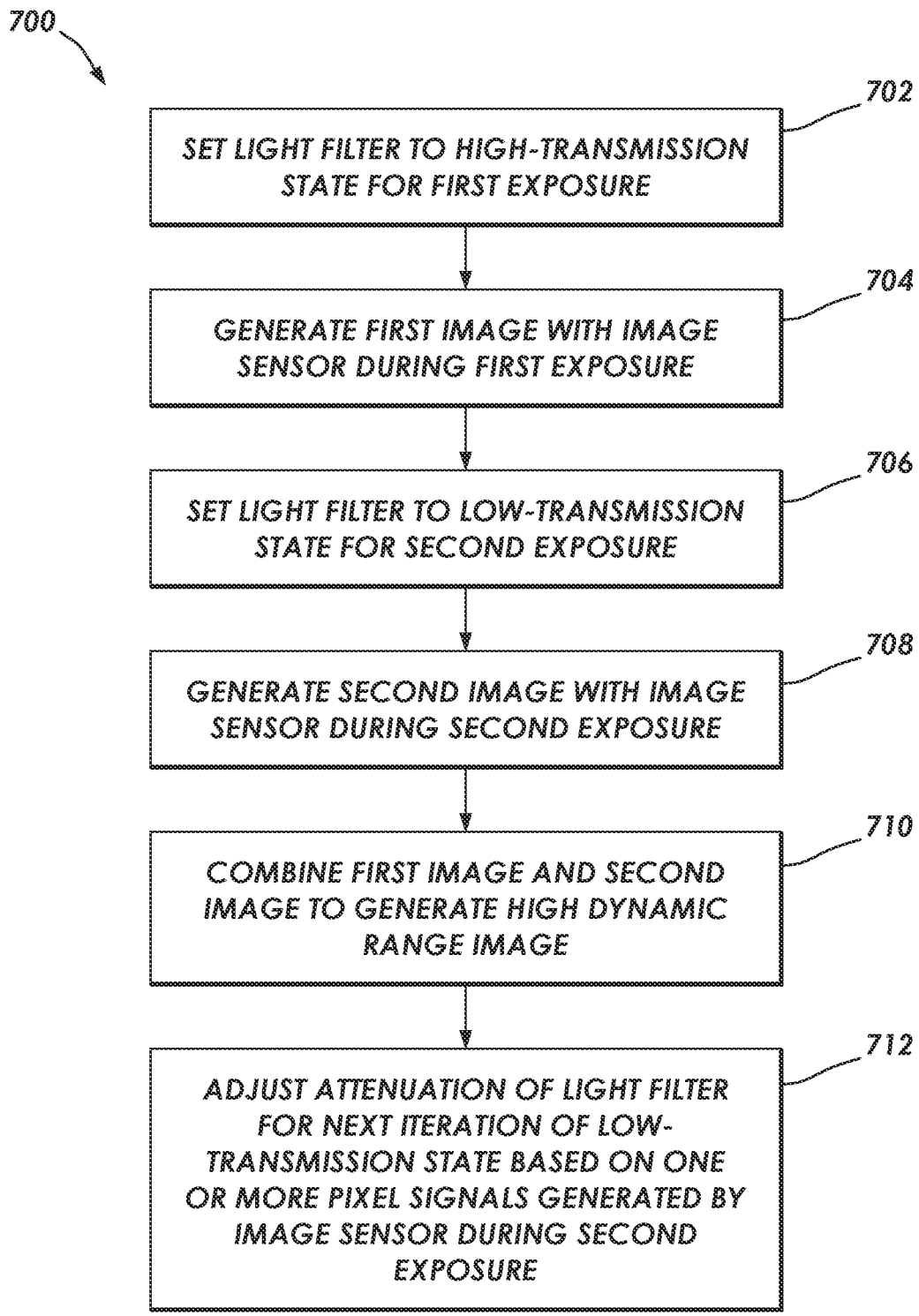
FIG. 7 is a flow diagram of an example of a method for HDR imaging with adaptive optical attenuation in accordance with some implementations.

The dynamic range of the scene may change over time. Thus, the imaging system 100 is configured to adjust the amount of attenuation provided by the light filter 402 while in the low-transmission state based on the dynamic range of the scene. FIG. 7 is a flow diagram of an example of a method 700 for HDR imaging with adaptive optical attenuation in accordance with some implementations. For simplicity of explanation, the method 700 is depicted in FIG. 7 and described as a series of operations. However, the operations can occur in various orders and/or concurrently, and/or with other operations not presented and described herein. At block 702, the light filter 402 is set to the high-transmission state for a first exposure. As described above, the light filter 402 may provide the maximum amount of light transmission that the light filter 402 can be controlled to provide while in the high-transmission state. At block 704, a first image is generated with the image sensor 106 during the first exposure. In some implementations, the integration time of the first exposure is sufficiently long to capture flickering lights. For example, the integration time of the first exposure may be greater than 11.1 milliseconds for capturing a scene with a 90 Hertz LED.

At block 706, the light filter 402 is set to the low-transmission state for a second exposure. As described above, the light filter 402 provides less light transmission in the low-transmission state than in the high-transmission state. At block 708, a second image is generated with the image sensor 106 during the second exposure. In some implementations, the integration time of the second exposure is also sufficiently long to capture flickering lights. For example, the integration time of the second exposure may also be greater than 11.1 milliseconds for capturing a scene with a 90 Hertz LED.

At block 710, the first image and the second image are combined to generate an HDR image. In some implementations, the imaging controller 108 may combine the images by using a multi-exposure HDR combination algorithm, such as digital lateral overflow (DLO). Data from the first image is used for dimmer regions of the scene, and data from the second image is used for brighter regions of the scene. At intermediate signal levels, data from both images are combined to produce the HDR image. The resulting HDR image has high signal-to-noise (SNR) ratio over a wide range of light conditions and flicker artifacts are mitigated.

At block 712, the attenuation of the light filter 402 for the next iteration of the low-transmission state is adjusted based on one or more pixel signals generated by the image sensor 106 during the second exposure. In other words, the attenuation of the light filter 402 for the next second image is adjusted based on the pixel signals from the current second image. In some implementations, the attenuation of the light filter 402 for the next iteration of the low-transmission state is adjusted based on the number of saturated pixels during the second exposure. For example, the attenuation of the light filter 402 may be increased when the percentage of saturated pixels during the second exposure is greater than a threshold percentage.

Figure 8:
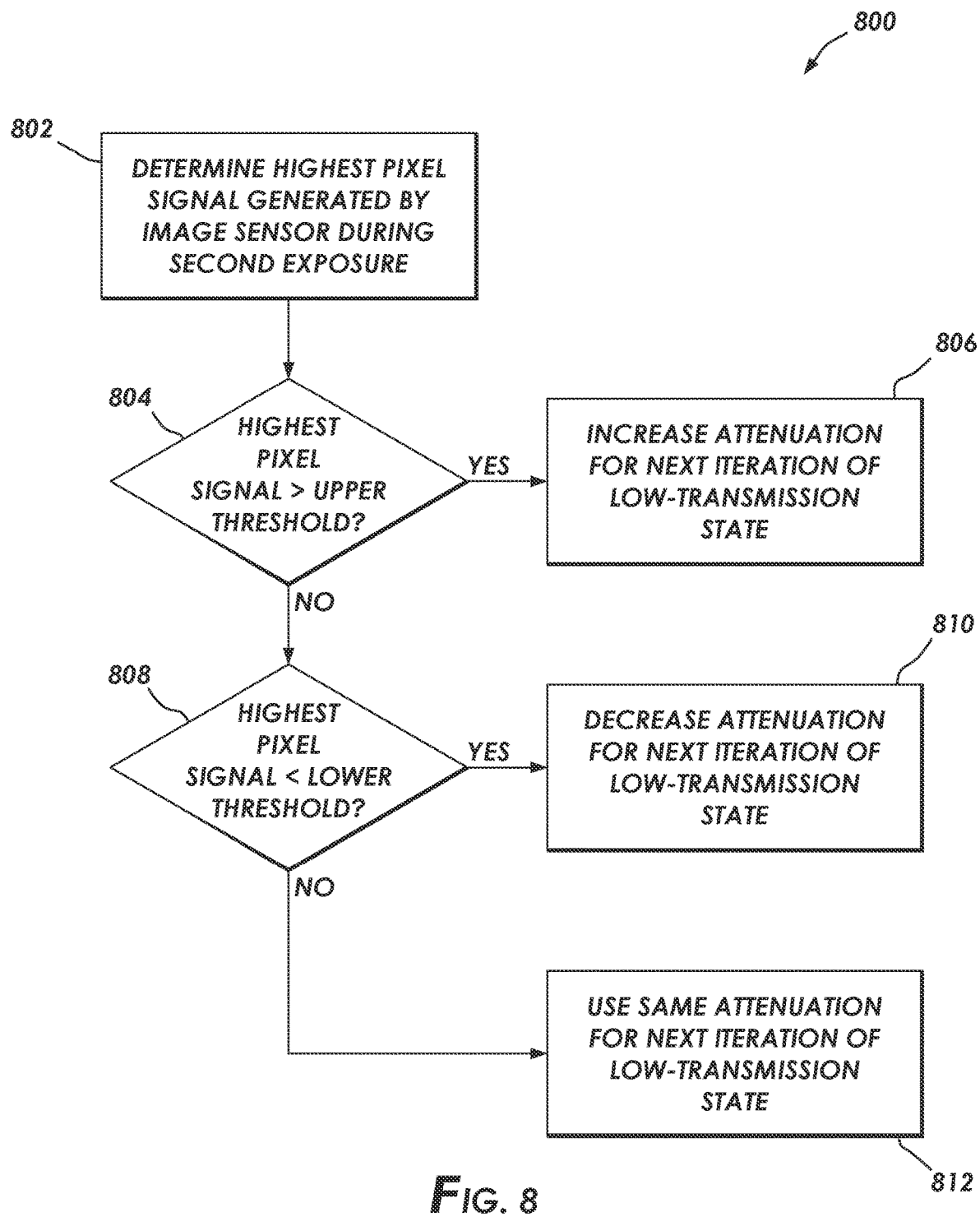
FIG. 8 is a flow diagram of an example of a method for adjusting light filter attenuation based on the highest pixel signal generated by the image sensor in accordance with some implementations.

In some implementation, the attenuation of the light filter 402 for the next iteration of the low-transmission state is adjusted based on the highest pixel signal generated by the image sensor 106 during the second exposure. FIG. 8 is a flow diagram of an example of a method 800 for adjusting the attenuation of the light filter 402 based on the highest pixel signal generated by the image sensor 106 during the second exposure in accordance with some implementations. At block 802, the highest pixel signal generated by the image sensor 106 during the second exposure is determined. At block 804, the highest pixel signal is compared to an upper threshold. When the highest pixel signal is greater than the upper threshold, the attenuation of the light filter 402 for the next iteration of the low-transmission state is increased at block 806. For example, when pixel signal $T_2(6)$ in the second image 504 of FIG. 5B is the highest pixel signal and is greater than the upper threshold, the imaging controller 108 may increase the attenuation of the light filter 402. Alternatively, when the highest pixel signal is less than or equal to the upper threshold, the highest pixel signal is compared to a lower threshold at block 808. The lower threshold is less than the upper threshold. When the highest pixel signal is less than the lower threshold, the attenuation of the light filter 402 is decreased at block 810. For example, when pixel signal $T_2(7)$ in the second image 504 of FIG. 5B is the highest pixel signal and is less than the lower threshold, the imaging controller 108 may decrease the attenuation of the light filter 402. Alternatively, when the highest pixel signal is greater than or equal to the lower threshold, the same attenuation is used for the next iteration of the low-transmission state at block 812.

Returning to FIGS. 6A and 6B, in both rolling shutter and global shutter schemes, each row of the pixel array 210 is read out sequentially. In some implementations, the image sensor 106 may include an imaging pipeline that determines a combined linearized HDR response based on pixel signals from a first image read and a second image read. Because the second image is captured after the first image is read out, the image sensor 106 may include memory to store pixel signals generated for the first image. The imaging system 100 may store the entire second image and adjust the attenuation for the next iteration of the low-transmission state based on one or more pixel signals in the second image.

Figure 9:
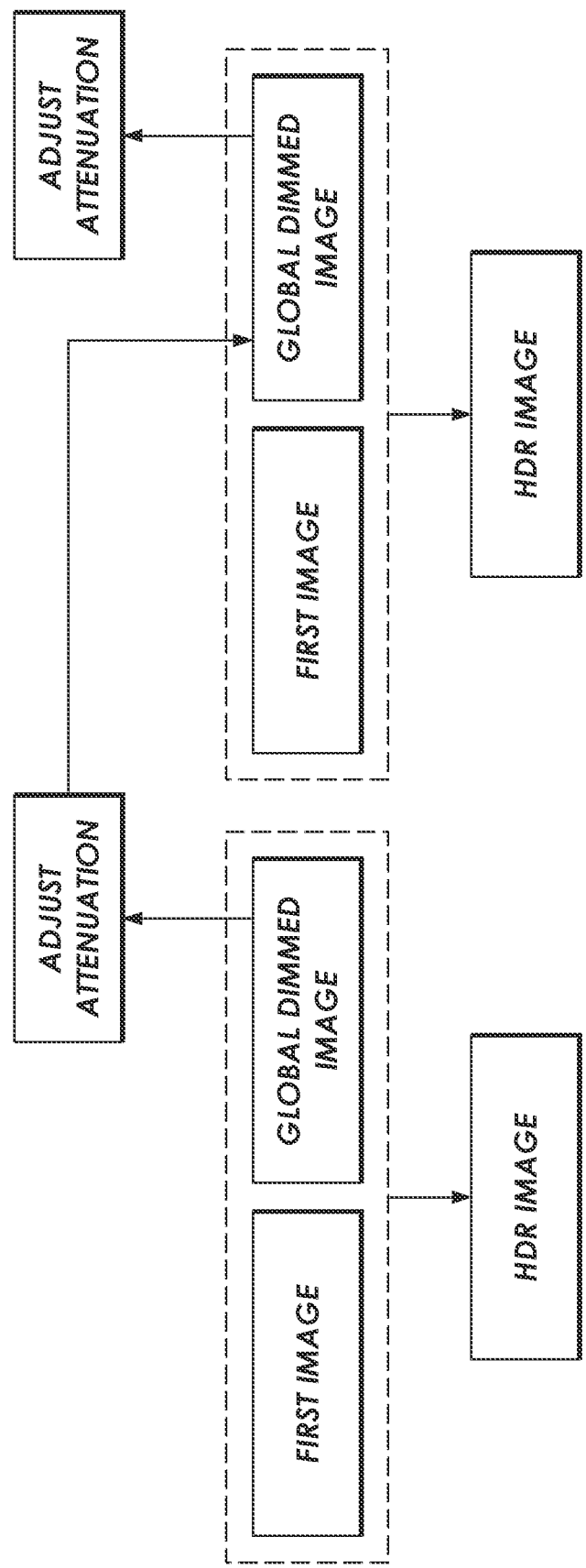
FIG. 9 is a block diagram of an example of HDR imaging with a global light filter in accordance with some implementations.
Figure 10B:
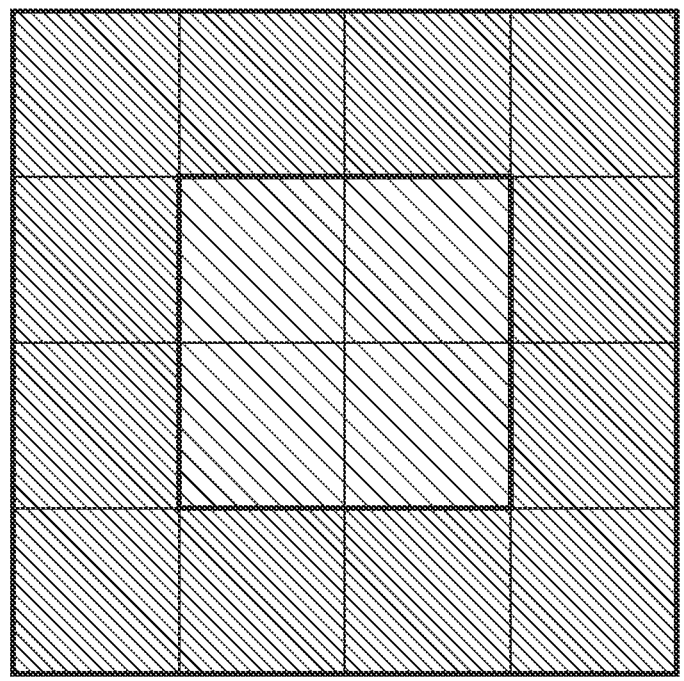
FIGS. 10A and 10B are diagrams of examples of patterned light filters in accordance with some implementations.
Figure 10A:
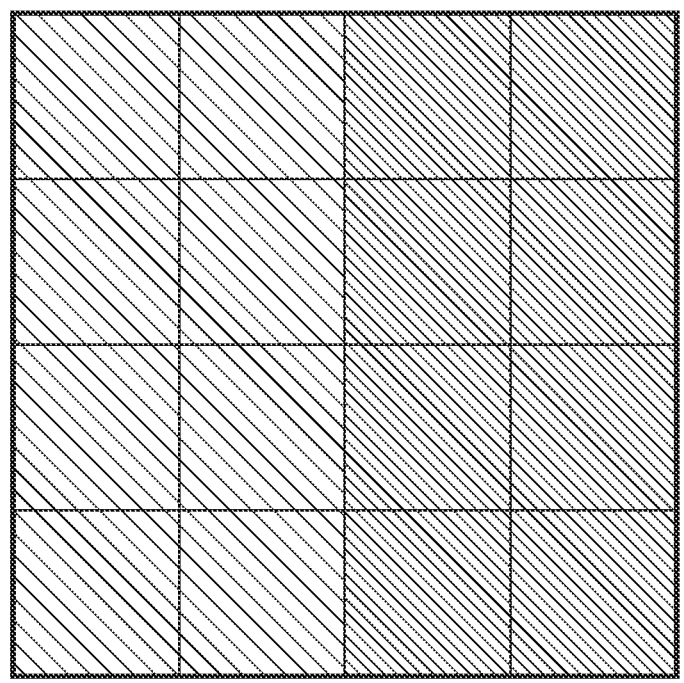

In some implementations, the light filter 402 is a global filter that provides uniform light attenuation to each of the image sensor pixels 212 in the pixel array 210. In such implementations, each second image is a global dimmed image and the attenuation of the light filter 402 may be adjusted based on each global dimmed image as illustrated in FIG. 9. In other implementations, the light filter 402 is patterned to provide different amounts of attenuation to different sections of the pixel array 210. FIGS. 10A and 10B are diagrams of examples of patterned light filters. The patterned light filter 1002 illustrated in FIG. 10A provides more attenuation to the image sensor pixels 212 on the bottom half of the pixel array 210 (an example of a "first subset of the plurality of image sensor pixels") than the image sensor pixels 212 on the top half of the pixel array 210 (an example of a "second subset of the plurality of image sensor pixels"). The patterned light filter 1004 illustrated in FIG. 10B provides more attenuation to the image sensor pixels 212 toward the center of the pixel array 210 (another example of a "first subset of the plurality of image sensor pixels") than the image sensor pixels 212 on the periphery of the pixel array 210 (another example of a "second subset of the plurality of image sensor pixels"). Other patterns may be used for the light filter.

Figure 11:
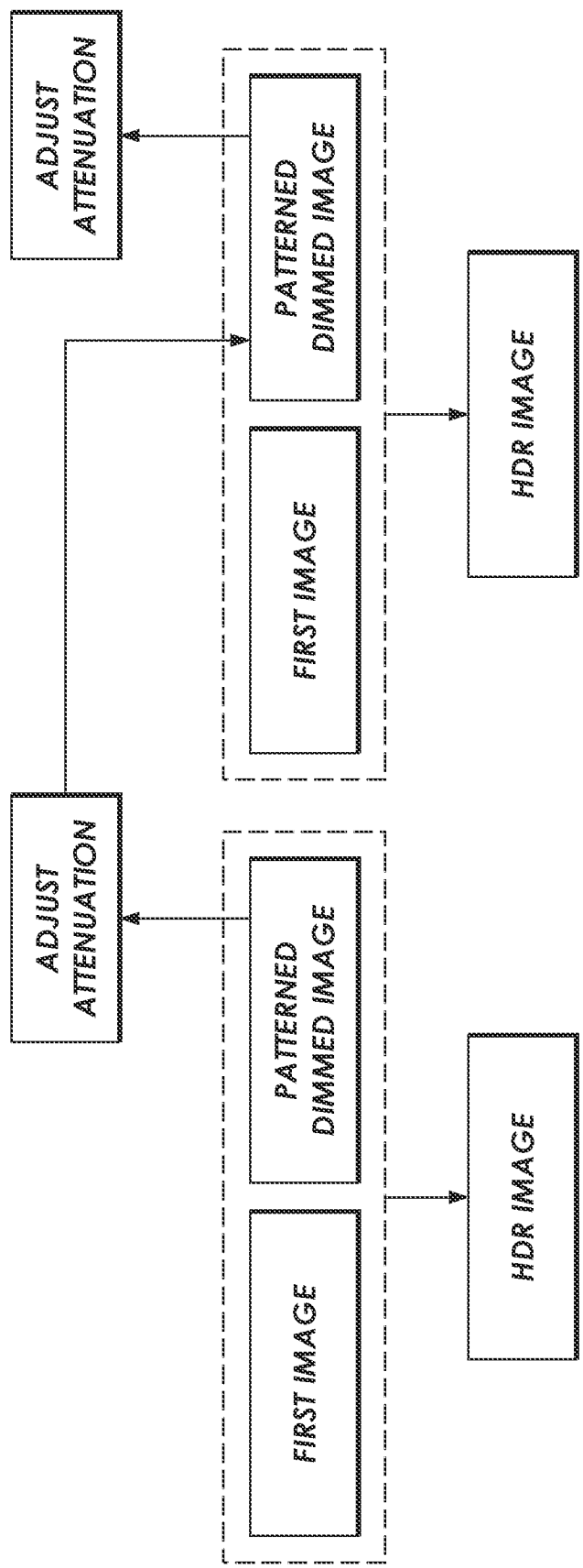
FIG. 11 is a block diagram of an example of HDR imaging with a patterned light filter in accordance with some implementations.

In imaging systems 100 with a patterned light filter, each second image is a patterned dimmed image and the attenuation of the light filter 402 may be adjusted based on each patterned dimmed image as illustrated in FIG. 11. Further, the attenuation of each portion of the light filter 402 may be adjusted based on the one or more pixel signals from that portion of the pixel array 210. For example, with reference to FIG. 10A, the imaging controller 108 may adjust the attenuation provided by the light filter 402 to image sensor pixels 212 located in the top half of the pixel array 210 based on one or more pixel signals generated by the image sensor pixels 212 located in the top half of the pixel array 210. Further, the imaging controller 108 may separately adjust the attenuation provided by the light filter 402 to image sensor pixels 212 located in the bottom half of the pixel array 210 based on one or more pixel signals generated by the image sensor pixels 212 located in the bottom half of the pixel array 210.

Figure 12:
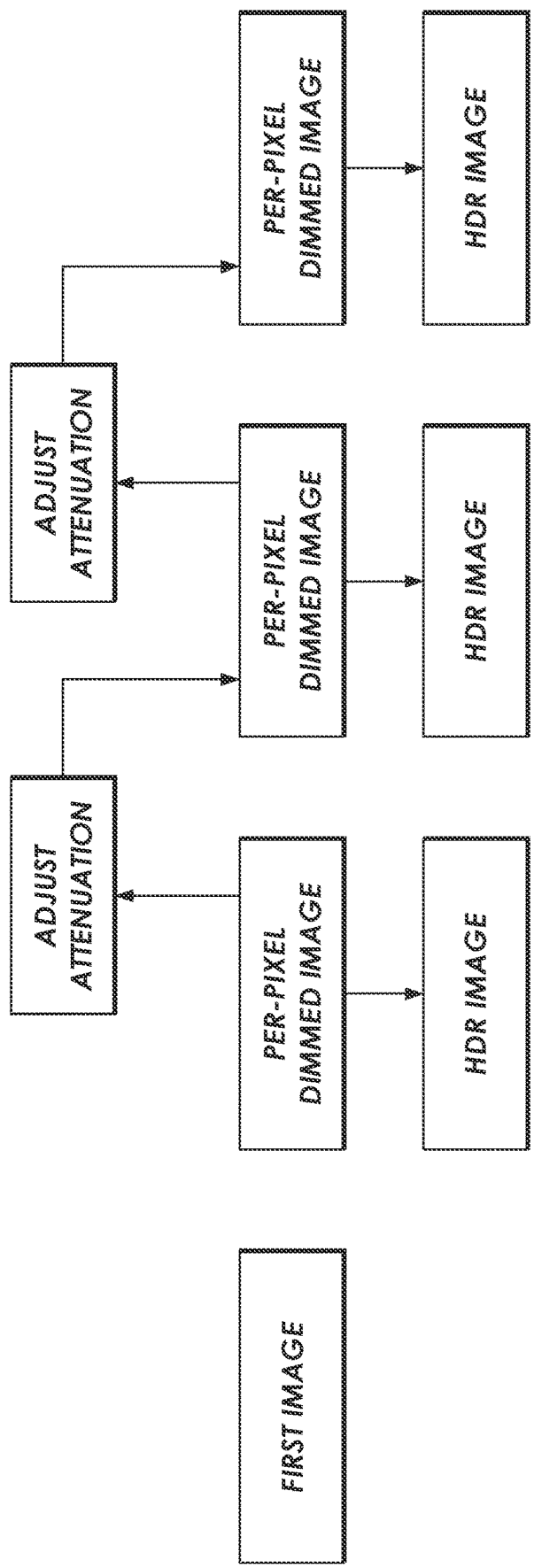
FIG. 12 is a block diagram of an example of HDR imaging with a per-pixel light filter in accordance with some implementations.

In some implementations, the light filter 402 is configured to individually control the amount of attenuation provided to each pixel in the pixel array 210. In such implementations, the amount of attenuation provided to each pixel in the pixel array 210 may be adjusted based on the individual pixel signals. For example, the imaging controller 108 may adjust the amount of attenuation provided by the light filter 402 to a first pixel based on the pixel signal generated by the first pixel, and separately adjust the amount of attenuation provided by the light filter 402 to a second pixel based on the pixel signal generated by the second pixel. In imaging systems 100 with a per-pixel light filter, each image captured after the first image is a per-pixel dimmed image and the attenuation of the light filter 402 may be adjusted based on each per-pixel dimmed image as illustrated in FIG. 12. With individual attenuation control for each pixel in the pixel array 210, the imaging system 100 may generate an HDR image for each exposure of the pixel array 210 as illustrated in FIG. 12. Thus, unlike some of the implementations described above, the imaging system 100 may generate HDR images without capturing multiple images in which the light filter 402 is in the high-transmission state. Further, the imaging system 100 may generate HDR images without switching the light filter 402 between the high-transmission state and the low-transmission state for each exposure.

Figure 13:
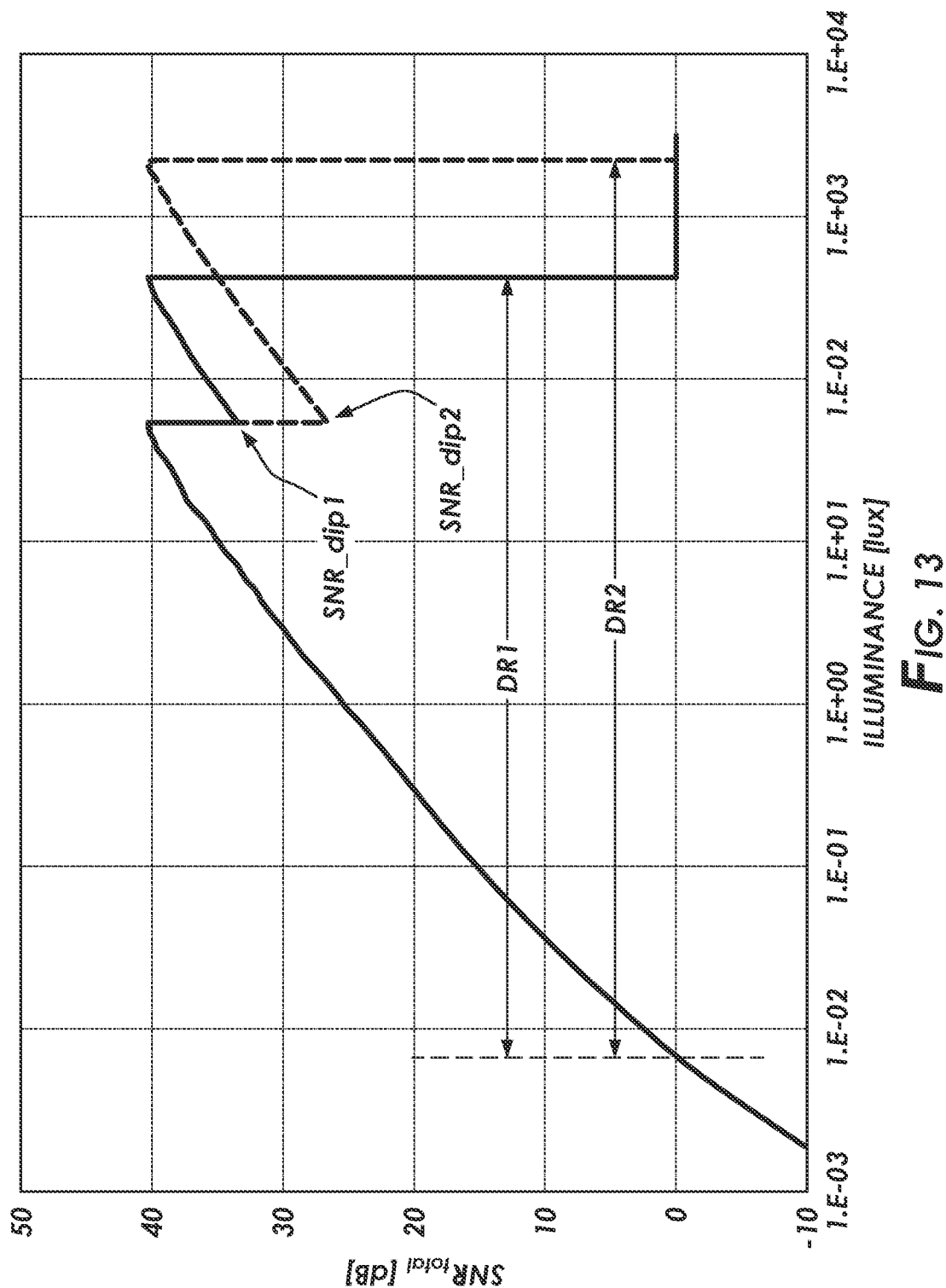
FIG. 13 illustrates plots of examples of signal-to-noise ratios for two combined HDR responses generated by different attenuations in accordance with some implementations.

There is a trade-off between the dynamic range of the combined HDR response and the drop in SNR at the transition point. For example, FIG. 13 illustrates plots of SNRs for two combined HDR responses generated by different attenuations of the light filter 402. The SNR of the combined HDR response with a smaller dynamic range DR1 in FIG. 13 drops at a transition point. The SNR of the combined HDR response with a larger dynamic range DR2 in FIG. 13 also drops at the transition point. As illustrated in FIG. 13, the SNR drop of the combined HDR response with the smaller dynamic range DR1 (labeled in FIG. 13 as SNR_dip1) is less than the SNR drop of the combined HDR response with the higher dynamic range DR2 (labeled in FIG. 13 as SNR_dip2). In other words, SNR at the transition point for a combined HDR response with a smaller dynamic range is higher than SNR at the transition point for a combined HDR response with a higher dynamic range. Therefore, when a lower dynamic range in the combined HDR response is sufficient to cover the entire dynamic range of the scene, the attenuation of the light filter 402 in the low-transmission state may be lowered to benefit from higher SNR at the transition point.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. An image sensor, comprising:
   a plurality of image sensor pixels;
   a light filter configured to attenuate transmission of incident light to the plurality of image sensor pixels; and
   a controller configured to:
      set the light filter to a high-transmission state for a first exposure,
      capture a first image generated by the plurality of image sensor pixels during the first exposure,
      set the light filter to a low-transmission state for a second exposure at least by setting the light filter to provide:
         a first amount of attenuation to a first subset of the plurality of image sensor pixels, and
         a second amount of attenuation to a second subset of the plurality of image sensor pixels,
      capture a second image generated by the plurality of image sensor pixels during the second exposure,
      combine the first image and the second image to generate a high dynamic range image,
      adjust the first amount of attenuation of the light filter for a next iteration of the low-transmission state based on one or more first pixel signals generated by the first subset of the plurality of image sensor pixels during the second exposure, and
      adjust the second amount of attenuation of the light filter for the next iteration of the low-transmission state based on one or more second pixel signals generated by the second subset of the plurality of image sensor pixels during the second exposure.

2. The image sensor of claim 1, wherein, to adjust the first amount of attenuation of the light filter for the next iteration of the low-transmission state, the controller is further configured to:
   increase the first amount of attenuation of the light filter when a highest pixel signal of the one or more first pixel signals is greater than an upper threshold, and
   decrease the first amount of attenuation of the light filter when the highest pixel signal of the one or more first pixel signals is less than a lower threshold.

3. The image sensor of claim 1, wherein the light filter is further configured to attenuate transmission of the incident light to the first subset of the plurality of image sensor pixels based on a bias voltage, and wherein, to adjust the first amount of attenuation of the light filter for the next iteration of the low-transmission state, the controller is further configured to adjust the bias voltage.

4. The image sensor of claim 1, wherein, to set the light filter to the high-transmission state for the first exposure, the controller is further configured to set the light filter to provide a maximum amount of light transmission to the plurality of image sensor pixels for the first exposure.

5. The image sensor of claim 1, wherein the image sensor is included in at least one selected from the group consisting of an automobile, a vehicle, a camera, a cellular telephone, a tablet computing, a webcam, a video camera, a video surveillance system, and a video gaming system.

6. The image sensor of claim 1, wherein, to adjust the first amount of attenuation of the light filter for the next iteration of the low-transmission state, the controller is further configured to determine an adjusted first amount of attenuation based on the one or more first pixel signals, wherein the high dynamic range image is a first high dynamic range image, and wherein the controller is further configured to:
set the light filter to the high-transmission state for a third exposure,
capture a third image generated by the plurality of image sensor pixels during the third exposure,
set the light filter to the low-transmission state for a fourth exposure at least by setting the light filter to provide the adjusted first amount of attenuation to the first subset of the plurality of image sensor pixels,
capture a fourth image generated by the plurality of image sensor pixels during the fourth exposure, and
combine the third image and the fourth image to generate a second high dynamic range image.

7. An imaging system, comprising:
an image sensor including a plurality of image sensor pixels;
a light filter configured to:
attenuate transmission of incident light to the image sensor, and
individually control attenuation of the light filter provided to each of the plurality of image sensor pixels; and
an imaging controller configured to:
set the light filter to a high-transmission state for a first exposure,
capture a first image generated by the image sensor during the first exposure,
set the light filter to a low-transmission state for a second exposure,
capture a second image generated by the image sensor during the second exposure,
combine the first image and the second image to generate a high dynamic range image, and
individually adjust the attenuation of the light filter provided to each of the plurality of image sensor pixels for a next iteration of the low-transmission state based on respective pixel signals generated by each of the plurality of image sensor pixels during the second exposure.

8. The imaging system of claim 7, wherein, to individually adjust the attenuation of the light filter provided to each of the plurality of image sensor pixels for the next iteration of the low-transmission state, the imaging controller is further configured to:
increase the attenuation of the light filter provided to one of the plurality of image sensor pixels in the low-transmission state when a pixel signal generated by the one of the plurality of image sensor pixels during the second exposure is greater than an upper threshold, and
decrease the attenuation of the light filter provided to the one of the plurality of image sensor pixels in the low-transmission state when the pixel signal generated by the one of the plurality of image sensor pixels during the second exposure is less than a lower threshold.

9. The imaging system of claim 7, wherein the light filter is further configured to attenuate transmission of the incident light to one of the plurality of image sensor pixels proportional to a bias voltage, and wherein, to individually adjust the attenuation of the light filter provided to each of the plurality of image sensor pixels for the next iteration of the low-transmission state, the imaging controller is further configured to adjust the bias voltage based on a pixel signal generated by the one of the plurality of image sensor pixels during the second exposure.

10. The imaging system of claim 7, wherein a first integration time of the first exposure is substantially equally to a second integration time of the second exposure.

11. The imaging system of claim 7, wherein the imaging system is included in at least one selected from the group consisting of an automobile, a vehicle, a camera, a cellular telephone, a tablet computing, a webcam, a video camera, a video surveillance system, and a video gaming system.

12. The imaging system of claim 7, wherein, to set the light filter to the low-transmission state for the second exposure, the imaging controller is further configured to set the light filter to provide a first amount of attenuation to one of the plurality of image sensor pixels during the second exposure, wherein, to individually adjust the attenuation of the light filter provided to each of the plurality of image sensor pixels for the next iteration of the low-transmission state, the imaging controller is further configured to determine a second amount of attenuation based on a pixel signal generated by the one of the plurality of image sensor pixels during the second exposure, wherein the high dynamic range image is a first high dynamic range image, and wherein the imaging controller is further configured to:
set the light filter to the high-transmission state for a third exposure,
capture a third image generated by the image sensor during the third exposure,
set the light filter to the low-transmission state for a fourth exposure at least by setting the light filter to provide the second amount of attenuation to the one of the plurality of image sensor pixels,
capture a fourth image generated by the image sensor during the fourth exposure, and
combine the third image and the fourth image to generate a second high dynamic range image.

13. The imaging system of claim 7, wherein, to set the light filter to the high-transmission state for the first exposure, the imaging controller is further configured to set the light filter to provide a maximum amount of light transmission to the plurality of image sensor pixels for the first exposure.

14. A method for high dynamic range imaging, the method comprising:
setting a light filter to a high-transmission state for a first exposure, wherein the light filter is configured to attenuate transmission of incident light to a pixel array of an image sensor;
generating a first image with the image sensor during the first exposure;
setting the light filter to a low-transmission state for a second exposure at least by setting the light filter to provide:
a first amount of attenuation to a first portion of the pixel array, and
a second amount of attenuation to a second portion of the pixel array;
generating a second image with the image sensor during the second exposure;

combining the first image and the second image to generate a high dynamic range image;

adjusting the first amount of attenuation of the light filter for a next iteration of the low-transmission state based on one or more first pixel signals generated by the first portion of the pixel array during the second exposure; and adjusting the second amount of attenuation of the light filter for the next iteration of the low-transmission state based on one or more second pixel signals generated by the second portion of the pixel array during the second exposure.

15. The method of claim 14, wherein adjusting the first amount of attenuation of the light filter for the next iteration of the low-transmission state further includes:

increasing the first amount of attenuation of the light filter when a highest pixel signal of the one or more first pixel signals is greater than an upper threshold, and decreasing the first amount of attenuation of the light filter when the highest pixel signal of the one or more first pixel signals is less than a lower threshold.

16. The method of claim 14, wherein adjusting the first amount of attenuation of the light filter for the next iteration of the low-transmission state further includes determining an adjusted first amount of attenuation based on the one or more first pixel signals, wherein the high dynamic range image is a first high dynamic range image, and where the method further comprises:

setting the light filter to the high-transmission state for a third exposure;

generating a third image with the image sensor during the third exposure;

setting the light filter to the low-transmission state for a fourth exposure at least by adjusting the light filter to provide the adjusted first amount of attenuation to the first portion of the pixel array;

generating a fourth image with the image sensor during the fourth exposure; and combining the third image and the fourth image to generate a second high dynamic range image.

17. The method of claim 14, wherein a first integration time of the first exposure is substantially equally to a second integration time of the second exposure.

18. The method of claim 14, wherein setting the light filter to the high-transmission state for the first exposure further includes setting the light filter to provide a maximum amount of light transmission to the image sensor for the first exposure.

19. The method of claim 14, wherein the image sensor is included in at least one selected from the group consisting of an automobile, a vehicle, a camera, a cellular telephone, a tablet computing, a webcam, a video camera, a video surveillance system, and a video gaming system.

20. The method of claim 14, wherein the light filter is configured to attenuate transmission of the incident light to the first portion of the pixel array based on a bias voltage, and wherein adjusting the first amount of attenuation of the light filter for the next iteration of the low-transmission state based on the one or more first pixel signals further includes adjusting the bias voltage.

* * * * *